(12) United States Patent
Dubovitsky et al.

(10) Patent No.: US 6,646,723 B1
(45) Date of Patent: Nov. 11, 2003

(54) HIGH PRECISION LASER RANGE SENSOR

(75) Inventors: Serge Dubovitsky, Los Angeles, CA (US); Oliver P. Lay, Altadena, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/143,169

(22) Filed: May 7, 2002

(51) Int. Cl.[7] .............................. G01C 3/08; G01B 9/02
(52) U.S. Cl. ..................... 356/4.1; 356/486; 356/485; 356/5.09
(58) Field of Search ............................... 356/4.1, 5.09, 356/5.1, 5.11, 5.14, 450, 484, 485, 486, 487, 491, 492, 493, 496, 498

(56) References Cited

U.S. PATENT DOCUMENTS

| | | | | |
|---|---|---|---|---|
| 4,167,329 A | * | 9/1979 | Jelalian et al. | 356/5.09 |
| 5,054,912 A | * | 10/1991 | Kuchel | 356/5.11 |
| 5,412,474 A | * | 5/1995 | Reasenberg et al. | 356/486 |
| 5,835,199 A | * | 11/1998 | Phillips et al. | 356/5.03 |
| 5,995,207 A | * | 11/1999 | Hall et al. | 356/5.09 |
| 6,496,267 B1 | * | 12/2002 | Takaoka | 356/497 |

OTHER PUBLICATIONS

"A Primer on Displacement Measuring Interferometers" 1999.
"Two–wavelength laser inteferometry using superheterodyne detection" R. Dandliker, R. Thalmann, and D. Prongue Optic Letters, vol. 13 No. 5, May 1988.
Sub–Nanometer Laser Metrology–Some Techniques and Models, Brad Hines et al.

* cited by examiner

Primary Examiner—Thomas H. Tarcza
Assistant Examiner—Brian Andrea
(74) Attorney, Agent, or Firm—John H. Kusmiss

(57) ABSTRACT

The present invention is an improved distance measuring interferometer that includes high speed phase modulators and additional phase meters to generate and analyze multiple heterodyne signal pairs with distinct frequencies. Modulation sidebands with large frequency separation are generated by the high speed electro-optic phase modulators, requiring only a single frequency stable laser source and eliminating the need for a first laser to be tuned or stabilized relative to a second laser. The combination of signals produced by the modulated sidebands is separated and processed to give the target distance. The resulting metrology apparatus enables a sensor with submicron accuracy or better over a multi-kilometer ambiguity range.

17 Claims, 3 Drawing Sheets

HIGH PRECISION LASER RANGE SENSOR

ORIGIN OF THE INVENTION

The invention described herein was made in the performance of work under a NASA contract, and is subject to the provisions of Public Law 96-517 (35 U.S.C. §202) in which the Contractor has elected not to retain title.

BACKGROUND OF THE INVENTION

1. Field of the Invention

The present invention relates generally to the precision measurement of distance, and more particularly to a long range laser range sensor using a single, frequency-stable source.

2. Description of Related Art

The precision of formation flying control is dependent upon the accuracy of the sensors measuring the relative distances between two bodies. The necessary position knowledge accuracy for future distributed spacecraft missions will be at the micron level and possibly even the nanometer level over inter-spacecraft distances of one to one hundred kilometers, posing unprecedented challenges for ranging precision and dynamic range.

Pulse-based time-of-flight sensors provide centimeter level accuracy, while optical interferometric systems provide nanometer level precision, but with an ambiguity range of approximately one micron. That is, a sensor with an ambiguity range of one micron cannot distinguish the difference between a distance separated by multiples of one micron—a distance of 1.123 microns will be indistinguishable from a distance of 5.123 microns. Thus, there is a gap in the current technology wherein no state of the art technology provides nanometer level accuracy in an ultra-high dynamic range sensor.

FIG. 1 illustrates a heterodyne interferometer. Interferometry is a displacement measurement method in which a path length change between two fiducial points manifests itself as a phase change of the carrier wave. The heterodyne interferometer is a device that uses a low frequency electronic signal having a phase that carries the optical carrier phase. Because the phase of the low frequency heterodyne signal can be measured very precisely, heterodyne interferometers are used for high-precision applications.

A laser 100 that is selected to have a stable and predictable optical signal over time provides a fundamental optical signal v that is provided to a frequency shifting unit 120. The fundamental optical signal is converted into two distinct optical signals with closely separated frequencies, the target frequency $(v+f_T)$ and the local frequency $(v+f_L)$, by the frequency shifting unit 120. The two optical signals form what is known as a 'heterodyne pair.' Although shown in FIG. 1 as a separated pair of signals for clarity, the two signals can actually be incident upon one another with orthogonal linear polarizations. The two optical signals, target and local, are introduced to a non-polarizing beam splitter 140 that transmits part of the signals and deflects the remaining portion of the signals to a reference photodetector 150. The two deflected signals travel the exact same distance and when combined provide a reference condition to measure the displaced signal. The transmitted signals are directed to a polarizing beam splitter (PBS) 160 that distinguishes between the target and local frequency signals. The local frequency signal is transmitted through the PBS to a signal photodetector 190 while the target frequency signal is directed to a first retro-reflector 170 corresponding to a fixed position for measurement. The target frequency signal is then reflected through the PBS 160 to a second retro-reflector 180 on the displaced vehicle (not shown), and then reflected to the signal photodetector 190. The target frequency signal and the local frequency signal received by the signal photodetector 190 differ in the distance traveled by 2L, where L is the distance between the two retro-reflectors 170,180.

Small changes in L cause a measurable change in the phase of the target frequency signal. When the target frequency signal and the local frequency signal are mixed at the photodetectors 150,190, the phase of the output signal at frequency $(f_T-f_L)$ is indicative of the relative phase of the two input signals. The phase meter 195 compares the phase of the heterodyne signal from the signal photodetector 190 with that generated by the reference photodetector 150. The measured phase $\phi$ is equal to the optical phase delay between the target signal and the local signal and contains the desired distance information $$\phi \approx 4\pi vL/c$$

This equation has solutions for L that repeat at intervals of the ambiguity range, $\Delta_L \approx c/2v$, or 0.65 μm for a 1.3 μm laser. Standard heterodyne metrology does not distinguish between the many possible solutions, and is therefore only useful as a differential metrology system that measures changes in distance.

This limitation can be overcome with a two-source interferometer, where standard heterodyne phase measurements are made using two different optical frequencies, $v_1$ and $v_2$:

$$\phi_1 = 4\pi v_1 L/c$$

$$\phi_2 = 4\pi v_2 L/c$$

The difference in phases is given by the expression $$\phi_1 - \phi_2 = 4\pi(v_1-v_2)L/c, \text{ or}$$

$$\phi_1 - \phi_2 = 4\pi F_S L/c,$$

where the "synthetic" frequency $F_S$ replaces the difference in the actual frequencies. The ambiguity range for this difference measurement is increased to $\Delta_L \approx c/2vF_S$, and the range resolution is $\sigma_L = \rho c/2F_S$, where $\rho$ is the phase resolution in fractions of a cycle. Two source or two "color" interferometers use two separate lasers to generate $v_1$ and $v_2$. However, there are major drawbacks to this approach.

Traditionally, two color absolute interferometers are implemented with two lasers detuned from each other by the required frequency. The required frequency detuning can be achieved with semiconductor lasers, but the semiconductor lasers do not have the narrow linewidth and high frequency stability required for range measurements over long target distances. A metrology scheme using direct intensity modulation of the optical carrier signal would require detection and processing of high frequency signals (approximately 120 GHz). However, efficient photodetectors that can operate at these frequencies do not currently exist and therefore the detection of this modulation, if possible at all, would require high optical power. For many proposed applications of the sensor of the present invention, a constraint that the sensor operate with low received optical power precludes this possibility. Further, methods for dealing with high levels of self-interference have been developed for heterodyne interferometers, but presently there are no comparable methods that exist for direct modulation systems.

SUMMARY OF THE INVENTION

The present invention is an improved distance measuring interferometer that includes high speed phase modulators and additional phase meters to generate and analyze multiple heterodyne signal pairs with distinct frequencies. Modulation sidebands with large frequency separation are generated by the high speed electro-optic phase modulators requiring only a single frequency stable laser source and eliminating the need for a first laser to be tuned or stabilized relative to a second laser. The combination of signals produced by the modulated sidebands is separated and processed to give the target distance. The resulting metrology apparatus enables a sensor with submicron accuracy or better over a multi-kilometer ambiguity range.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved interferometer using phase modulators to create sideband frequencies that when evaluated yield a more precise sensor.

Figure 1:
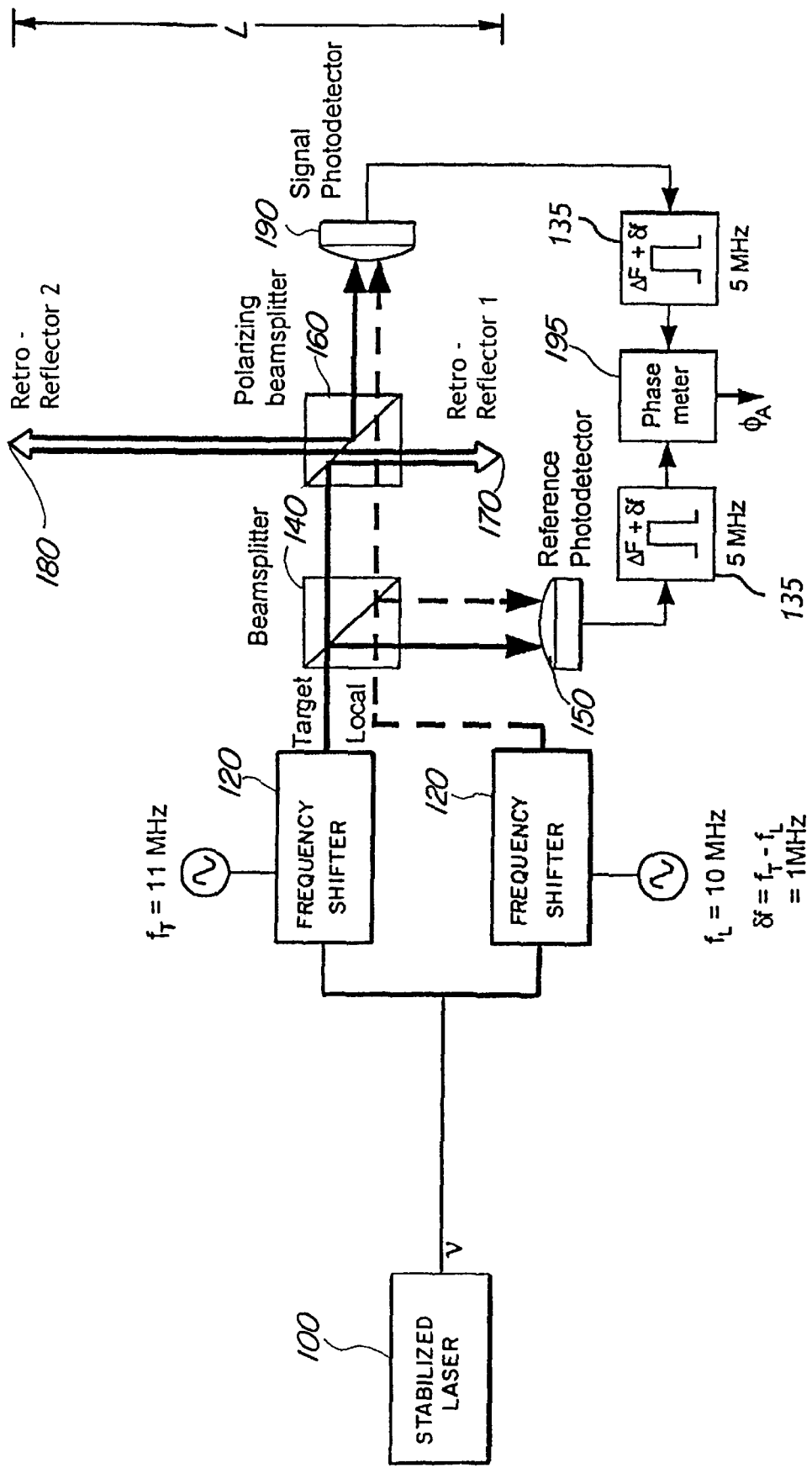
FIG. 1 is a schematic of a prior art heterodyne interferometer.
Figure 2:
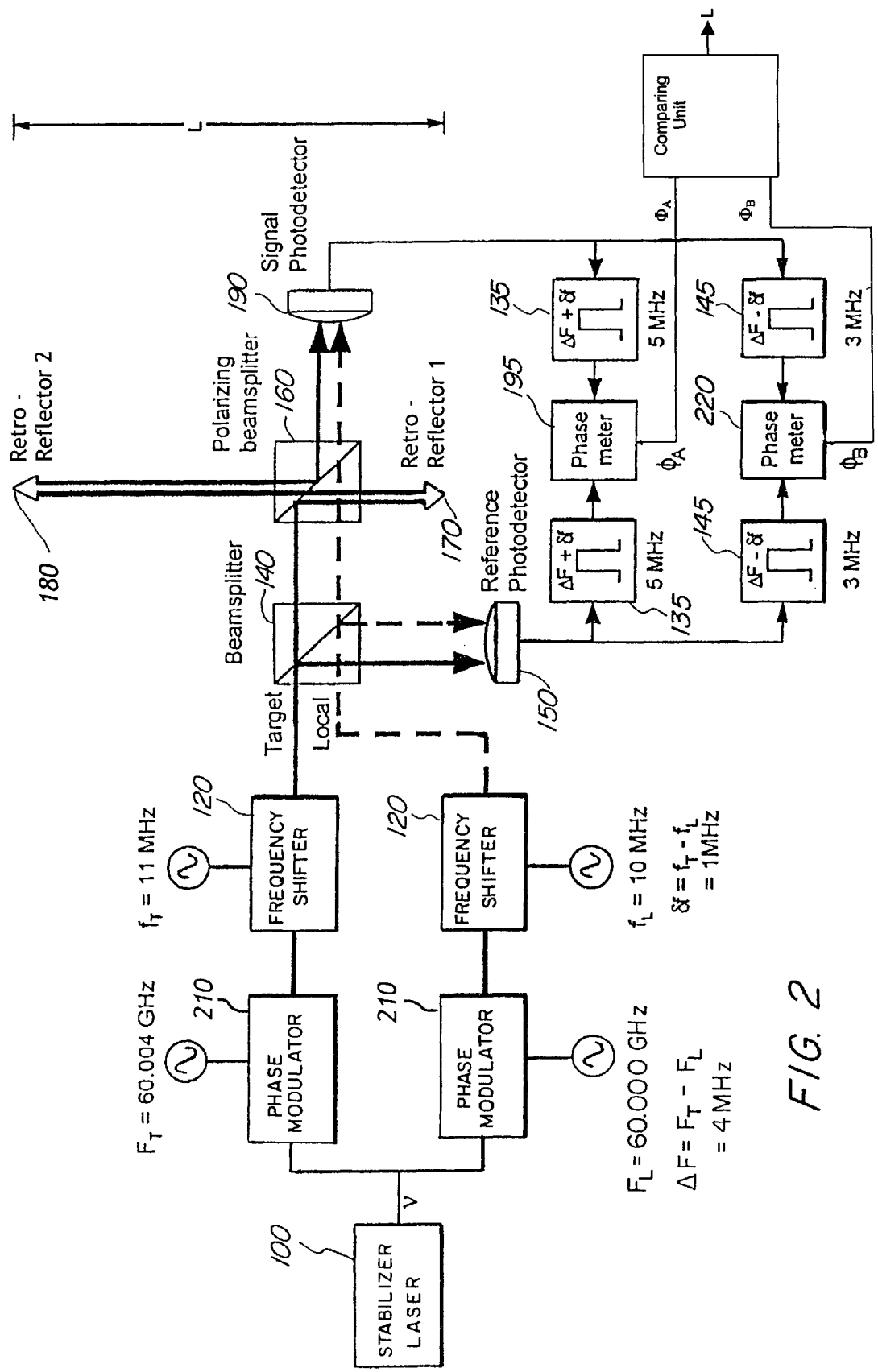
FIG. 2 is a schematic of a preferred embodiment of the present invention.

FIG. 2 presents a schematic of a preferred embodiment of the present invention. Compared with FIG. 1, a pair of high speed electro-optical phase modulators 210 have been introduced prior to the frequency shifting units. Amplitude modulation of the carrier signal may be used instead of phase modulation. A second phase meter 220 has also been added to the basic configuration. A comparing unit 230 has been added to compare the outputs of the optical phase meters 195 and 220 to give the target distance. The associated advantages of the new configuration is made evident by the discussion presented below.

The target signal or beam is processed by the phase modulator 210 such that a sinusoidal phase modulation $\Delta\Phi \sin(2\pi F_T t)$ is applied to the carrier frequency v, creating a series of sidebands spaced by $\pm mF_T$ where m is any integer. In the example given, $F_T$ is 60.004 GHz. The carrier signal and the sidebands are then frequency shifted by the frequency shifter 120 by $f_T$, where $f_T$ is 11 MHz for example. The amplitude of the sidebands are determined using Bessel functions. Similar modulation is conducted on the local signal. The local signal is modulated to create a second series of sidebands spaced $\pm mF_L$, where m is any integer. $F_L$ is 60.000 GHz in the example. The carrier signal and the modulated local signal are then frequency shifted by $f_L$, where $f_L$ is 10MHz for example. The difference between $F_T$ and $F_L$, denoted $\Delta F$, is 4 MHz in the example provided, and the difference between $f_T$ and $f_L$, denoted $\delta f$, is 1 MHz in the example.

Figure 3:
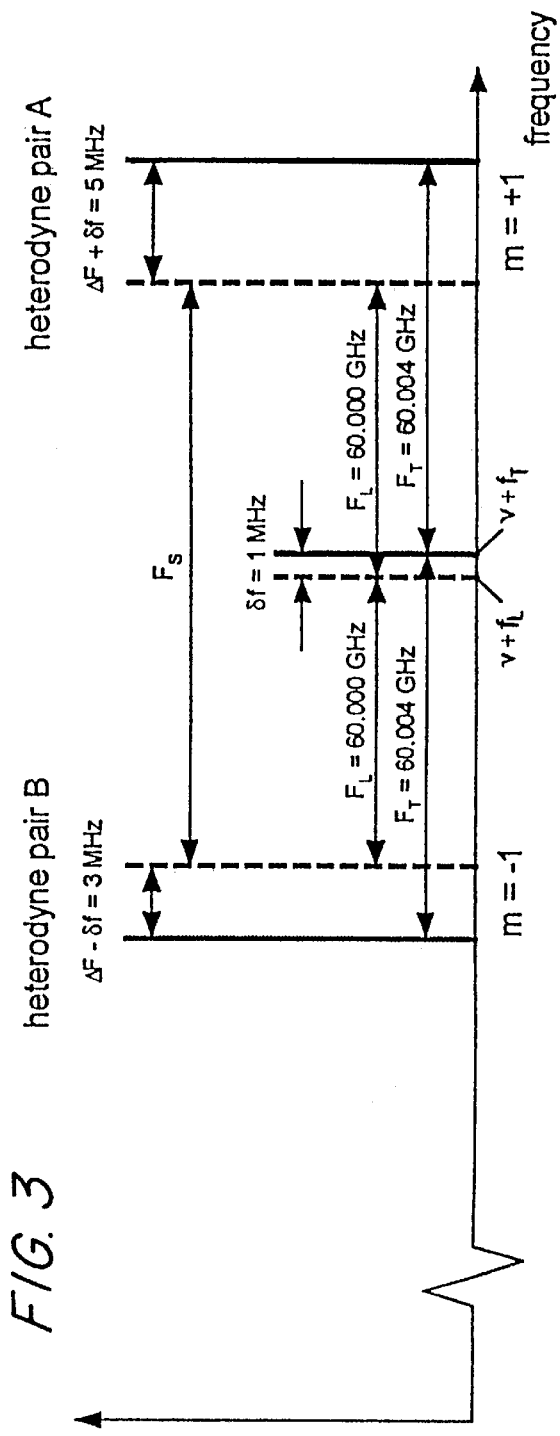
FIG. 3 is an optical spectrum illustrating the carrier frequency and two sideband frequencies generated by the phase modulators.
Figure 4:
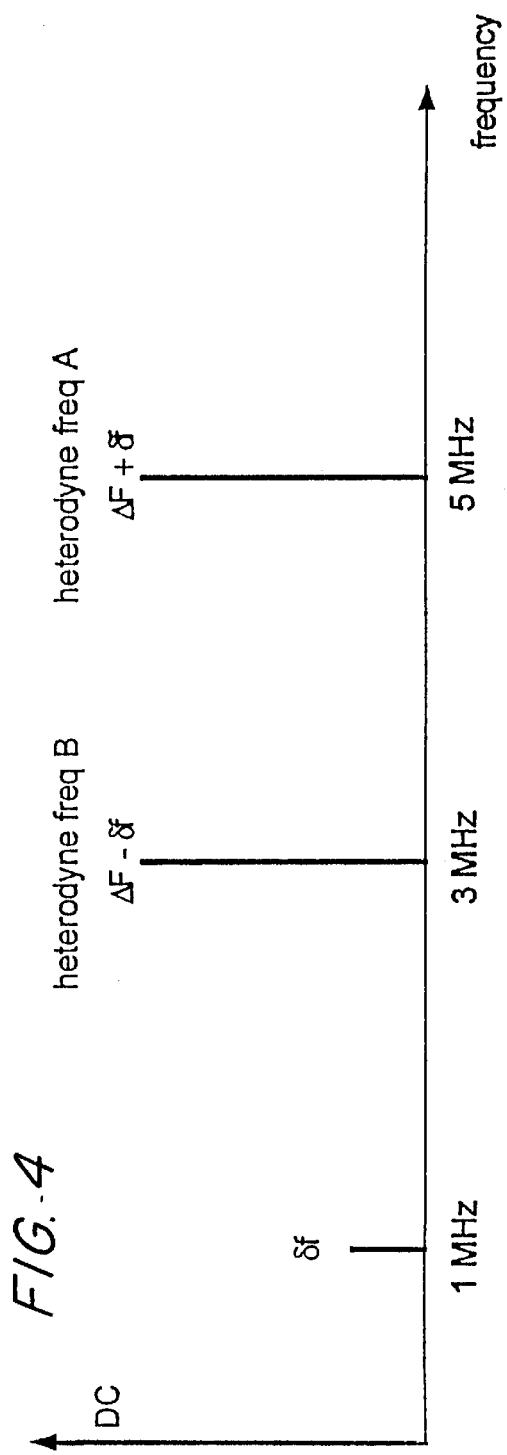
FIG. 4 is an example of a spectrum of signal amplitude observed by the photodetectors.

FIG. 3 illustrates the optical spectrum for both the target signal and the local signal, where second and higher order sidebands ($m \geq 2$) have been omitted for clarity. The upper sidebands ($v+F_T+f_T$, $v+F_L+f_L$) separated in frequency by ($\Delta F+\delta f$, or 5 MHz in the example) form one distinct heterodyne pair A, and the lower sidebands ($v-F_T+f_T$, $v-F_L+f_L$) separated in frequency by ($\Delta F-\delta f$, or 3 MHz in the example) form another distinct heterodyne pair B. FIG. 3 illustrates graphically the relationship of the heterodyne pairs. The three lowest frequency products after photodetion are shown in FIG. 4.

The first upper and first lower sidebands (m=1 and −1) are used to generate a synthetic frequency $F_S=2F_T$. Filters 135,145 isolate heterodyne frequencies A ($=\Delta F+\delta f$) and B ($=\Delta F-\delta f$) into the phase meters 195, 220, respectively. The phase meter outputs are:

$$\phi_A = 2\pi(v+f_T+F_T)(2L/c) \text{ and } \phi_B = 2\pi(v+f_T-F_T)(2L/c).$$

The individual measurements have the same range resolution and ambiguity range as the standard heterodyne interferometer, and constitute the "fine" sensor. The difference between the two outputs forms the "bridging" sensor output:

$$\phi_A - \phi_B = 4\pi F_T(2L/c)$$

For a dynamic range of 5000 ($\rho = 2 \times 10^{-4}$), a phase modulation frequency $F_T = 60$ GHz is required for a resolution of $\sigma_L = 0.25$ μm. The ambiguity range is now extended to $(c/4F_T)$, or 1.25 mm. By switching to lower modulation frequency, the ambiguity range can be extended much further as needed. For example, choosing $F_T' = 30$ MHz extends the ambiguity range to 2.5 m. Further, the results above are presented only for the first sidebands, but if additional sidebands are incorporated into the calculations the phase modulation frequency can be lowered by a factor of two. The use of the carrier frequency with the first sidebands can further extend the ambiguity range by a factor of two.

A millimeter-wave source is needed to drive the phase modulators at 60 GHz. Maximizing the power in the first sidebands requires a phase modulation amplitude of $\Delta\Phi = 1.9$ radians. Existing phase modulators require several hundred milliwatts of RF power to achieve this level of modulation. For a flight system it is important to reduce this power, requiring much more efficient phase modulators. More efficient phase modulators would also enable higher order sidebands, allowing the sensor to meet its performance requirements with lower phase resolution. The required frequency knowledge of the RF source depends on the distance to be measured. For operation at one kilometer, the fractional knowledge requirement is $2.5 \times 10^{-10}$ to obtain an accuracy of 0.25 μm. Millimeter-wave oscillator systems that satisfy these requirements have already been developed for applications in millimeter-wave astronomy.

The present invention enables unambiguous measurement of range with nanometer accuracy. Existing methods, such as pulse laser rangers, can perform unambiguous range measurements but with only millimeter accuracy. Yet other methods, e.g., optical interferometers, can perform measurements of changes in target distance with nanometer resolution, but the measurements are ambiguous in a sense that one does not know the actual distance to the target. Currently there are no range sensors that can perform unambiguous measurements with nanometer accuracy.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A high precision laser range sensor comprising:
    a single laser for generating a carrier frequency;
    an optical splitter to split the carrier frequency into local and target arms;
    a frequency shifting unit to introduce a frequency shift offset between the target and local arms;
    a pair of high speed modulators that apply modulation to the carrier frequency in the local and target arms to produce a series of modulation sidebands, the high speed modulators having modulation frequencies of $F_L$ and $F_T$; and
    a comparing unit for comparing a phase difference between the local and target arms with modulation sidebands where each modulation sideband forms a low frequency heterodyne pair.

2. The high precision laser range sensor of claim 1 wherein the comparing unit comprises signal and reference photodetectors, and first and second phase meters.

3. The high precision laser range sensor of claim 1 wherein the modulation of the carrier signal by the high speed modulators is a phase modulation.

4. The high precision laser range sensor of claim 1 wherein the modulation of the carrier signal by the high speed modulators is an amplitude modulation.

5. The high precision laser range sensor of claim 1 wherein the ambiguity range is given by $c/4F_T$.

6. A method for measuring a distance between two points comprising the steps of:
    providing a single frequency stable source of electromagnetic signal;
    dividing the signal into a target signal and a local signal;
    applying a sinusoidal phase modulation to the target signal and the local signal;
    applying a frequency shifting operation to the modulated target signal and the modulated local signal to generate at least two heterodyne pairs;
    directing a portion of the target signal and a portion of the local signal to a reference photodetector, while transmitting a portion of the target signal and the local signal;
    passing the transmitted local signal to a signal photodetector, while deflecting the transmitted target signal to a pair of retro-reflectors before deflecting the target signal to the signal photodetector;
    measuring a phase difference of a first heterodyne pair between the reference photodetector and the signal photodetector;
    measuring a phase difference of a second heterodyne pair between the reference photodetector and the signal photodetector; and
    comparing the phase differences between the first and second heterodyne pairs.

7. The method of claim 6 wherein the phase modulation is accomplished using a high speed electro-optic modulator.

8. The method of claim 6 wherein the two heterodyne pairs correspond to first upper and lower sidebands of the carrier frequency.

9. The method of claim 6 wherein the directing of a portion of the target signal and a portion of the local signal to a reference photodetector, while transmitting a portion of the target signal and the local signal, is accomplished using a nonpolarizing beam splitter.

10. The method of claim 6 wherein the passing of the transmitted local signal to a signal photodetector, while deflecting the transmitted target signal to a pair of retro-reflectors before deflecting the target signal to the signal photodetector, is accomplished using a polarizing beam splitter.

11. A high precision laser range sensor comprising:
    a single laser for generating a carrier signal;
    a first modulator for applying a modulation of a first modulation frequency to a portion of the carrier signal, the first modulator outputting a first modulated signal with a first series of sidebands spaced at plus and minus the first modulation frequency comprising a first series of upper and lower sidebands;
    a second modulator for applying a modulation of a second modulation frequency to a portion of the carrier signal, the second modulator outputting a second modulated signal with a second series of sidebands spaced at plus and minus the second modulation frequency comprising a second series of upper and lower sidebands;
    a first frequency shifter for applying a first frequency shift to the first modulated signal, the first frequency shifter outputting a target signal;
    a second frequency shifter for applying a second frequency shift to the second modulated signal, the second frequency shifter outputting a local signal,
        wherein the sidebands of the target and local signals generate at least two heterodyne pairs;
    a reference photodetector for detecting a portion of the each of the target and local signals;
    a first partial deflector for deflecting a portion of each of the target and local signals to the reference photodetector, the first partial deflector passing a portion of each of the target and local signals;
    a signal photodetector for detecting a portion of the each of the target and local signals;
    a second partial deflector for deflecting a portion of the target signal to a first retro-reflector, the second partial deflector passing a portion of the local signal, the first retro-reflector being placed at a first distance from the second partial deflector, the first retro-reflector reflecting a portion of the target signal from the second partial deflector to a second retro-reflector, the second retro-reflector being placed at a second distance from the first retro-reflector and a third distance from the second partial deflector, the second retro-reflector reflecting a portion of the target signal from the first retro-reflector to the second partial deflector, the second partial deflector deflecting a portion of the target signal from the second retro-reflector to the signal photodetector, the second distance being equal to the sum of the first and third distances,
    a first phase meter for measuring a first phase difference between the reference photodetector and the signal photodetector of the first heterodyne pair, the first phase difference corresponding to a first set of distance measurements that repeat on a first ambiguity range;

a second phase meter for measuring a second phase difference between the reference photodetector and the signal photodetector of the second heterodyne pair, the second phase difference corresponding to a second set of distance measurements that repeat on the period of a second ambiguity range; and a comparing unit for comparing the first phase difference and the second phase difference, the comparing unit determining a measured distance corresponding to the solution of the first and second distance measurements, the solution indicating the sum of the first, second, and third distances comprising twice the distance between the first and second retro-reflectors.

12. The high precision laser range sensor of claim 11, further comprising:

two first heterodyne pair filters for isolating the first heterodyne pair, the first heterodyne pair filters comprising a first reference photodetector filter and a first signal photodetector filter, the first reference photodetector filter for filtering the signal between the reference photodetector and the first phase meter, the first signal photodetector filter for filtering the signal between the signal photodetector and the first phase meter.

13. The high precision laser range sensor of claim 11, further comprising:

two second heterodyne pair filters for isolating the second heterodyne pair, the second heterodyne pair filters comprising a second reference photodetector filter and a second signal photodetector filter, the second reference photodetector filter for filtering the signal between the reference photodetector and the second phase meter, the second signal photodetector filter for filtering the signal between the signal photodetector and the second phase meter.

14. The high precision laser range sensor of claim 11, wherein the second and subsequent upper and lower sidebands are included in the phase meter comparator calculation.

15. The high precision laser range sensor of claim 11, wherein the carrier frequency is included in the phase meter comparator calculation.

16. The high precision laser range sensor of claim 11, wherein the modulation of the carrier signal by the modulators is a phase modulation.

17. The high precision laser range sensor of claim 11, wherein the modulation of the carrier signal by the modulators is an amplitude modulation.

\* \* \* \* \*